United States Patent [19]

Tsunekawa et al.

[11] Patent Number: 4,644,149
[45] Date of Patent: Feb. 17, 1987

[54] PHOTOELECTRIC TRANSDUCER ELEMENT

[75] Inventors: Tokuichi Tsunekawa; Takashi Kawabata; Yuichi Sato; Susumu Matsumura, all of Kanagawa, Japan

[73] Assignee: Canon Kabushiki Kaisha, Japan

[21] Appl. No.: 601,055

[22] Filed: Apr. 16, 1984

[30] Foreign Application Priority Data

Apr. 18, 1983 [JP] Japan ................................ 58-68642

[51] Int. Cl.[4] .......................................... H01J 40/14
[52] U.S. Cl. ......................... 250/214 A; 250/214 AL
[58] Field of Search ........ 250/214 A, 214 AL, 214 B, 250/201 AF, 204

[56] References Cited

U.S. PATENT DOCUMENTS 4,274,735  6/1981  Tamura et al. .................. 250/214 B
4,319,133  3/1982  Currie et al. .................... 250/214 B Primary Examiner—Gene Wan
Attorney, Agent, or Firm—Toren, McGeady and Goldberg

[57] ABSTRACT

A photoelectric transducer element responsive to ambient light and a combination of ambient and projected light from light emitting apparatus operates with a predetermined cycle by signals from an oscillator. This produces respective output signals which are then stored on first and second storing apparatus. Signals from the storing apparatus provide information necessary for photographing, since the storing operation is synchronized with the oscillating operation.

8 Claims, 12 Drawing Figures

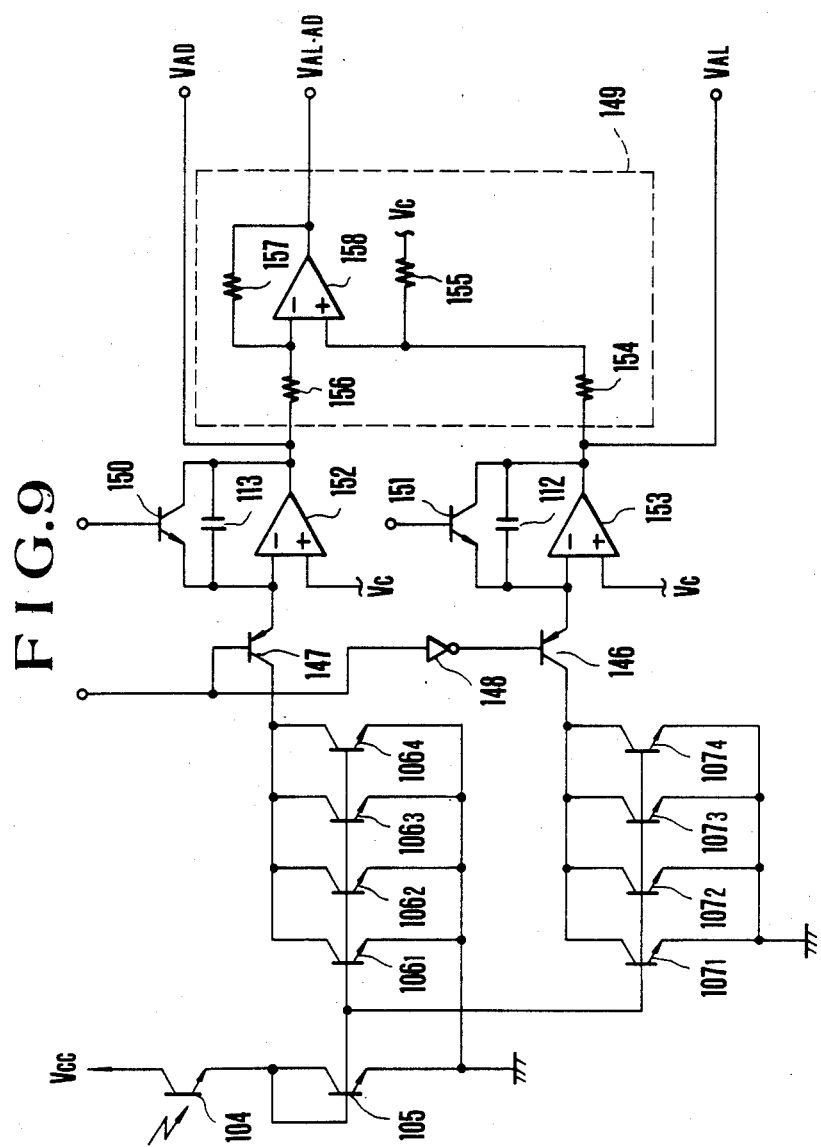

PHOTOELECTRIC TRANSDUCER ELEMENT

BACKGROUND OF THE INVENTION

1. Field of the Invention

This invention relates to photoelectric transducer elements, and more particularly to a photoelectric transducer element usable in devices for measuring object distance or for automatically focusing optical instruments in such a way that a light is projected from the device onto the object. Reflected light is received along with ambient light due to the sun light and/or artificial illumination, and is capable of producing output signals representing the projected light component and the ambient light component in a form distinguishable from each other.

2. Description of the Prior Art

The photoelectric transducer elements are selective because their selecting means relies on the MOS gate which had a large loss when ON and has been necessarily constructed in a form using a charge or CCD-like form.

A charge storing type light receiving element is shown in U.S. Pat. No. 3,999,192. The aforesaid U.S. Pat. No. 3,999,192 uses a charge storing type light sensor device having a sensor element receptive to reflected light and first and second charge storing portions each of which comprises two charge storing elements, as the aforesaid photoelectric light receiving means, wherein the projected light from the light projecting means disappears for a predetermined cycle. The aforesaid first and second control gate portions are controlled corresponding to the disappearance cycle of the projected light, whereby the charges generated on the respective sensor elements with and without the light being projected are applied to and stored on the respective charge storing elements in the first and second charge storing portions, separate from each other. The the accumulated charge on each of the elements in the first and second charge storing portions is taken out in appropriate timing. Then, the electrical signal difference obtained by accumulated charges on each pair of elements, which are related to each other with respect to each sensor element in those first and second charge storing portions, is obtained through a respective difference amplifier. Upon detection of either coincidence or disagreement between the two difference amplifier outputs, the focusing lens is moved to an adjusted position based on the detection signal, thereby focusing. Such a difference type amplifier is constructed with two light receiving elements. Based on the signals from the photoelectric transducing portions of the two light receiving elements, the position and distance of the object is measured. For example, when utilized in a photographic camera, the distance the focusing lens must be moved is computed. By this computation, it is possible to set up the focusing lens at a sharp focal point. Also, since the focusing lens is moving, when the in-focus condition is detected, the focusing lens can be stopped. In the light receiving device using such difference type amplifiers as described above, however, the gating control accuracy of each gate is required to increase.

The closest prior art known to Applicants is U.S. Pat. No. 4,274,735 and, in particular, FIG. 2 thereof. In the referenced patent, the gate elements for the memory elements (C1, C5) are constructed by the field effect transistors (GA1, GA1') having no function of amplification, while in the present invention the gate elements are constructed by the amplifying transistors (Ex. 6, 7). With this distinction, the present invention can obtain the high S/N ratio.

A first object of the present invention is to provide a photoelectric transducer element usable in a distance measuring device in which the reflected light of projected light by the light emitting means and reflected light of the ambient light such as sun light and artificial illumination are received, and the light received is subjected to photoelectric conversion so that the photoelectric transducing elements are obtained based on the aforesaid projected light and the ambient light. A photoelectric transducing signal is produced based on the projected light. Thereby the distance can be measured with great accuracy by the output signal of the photoelectric transducer element.

A second object of the present invention is to provide a photoelectric transducer element with the above feature and to provide components with many variations of the aforesaid changeover means, whereby the photoelectric transducer element is applicable to many fields and is suited for various purposes.

A further object is to provide a photoelectric transducer element which can produce an output of high sensitivity and high S/N ratio in a current mode of reduced loss.

SUMMARY OF THE INVENTION

To accomplish the first object of the present invention, the photoelectric transducer element, according to the invention, is provided with photoelectric transducing means receptive to projected light from light emitting means operating in a predetermined cycle by actuating signals from an oscillator. The ambient light for producing output signals represents the amount of incident light. The first storing means stores one of the photoelectric transducing signals which is responsible for the combination of projected light and ambient light. The second storing means stores the other photoelectric transducing signal which is responsible for ambient light. The means for changing the storing operation between the first and second storing means is synchronized with the operation of the oscillator.

To accomplish the second object, a photoelectric transducer element of the aforesaid construction can be constructed by the bipolar analog technique, whereby the above-described problems are solved.

BRIEF DESCRIPTION OF THE DRAWINGS

FIG. 9 is another circuitry example of the embodiment shown in FIGS. 1 to 4.

DESCRIPTION OF THE PREFERRED EMBODIMENTS

Figure 1:
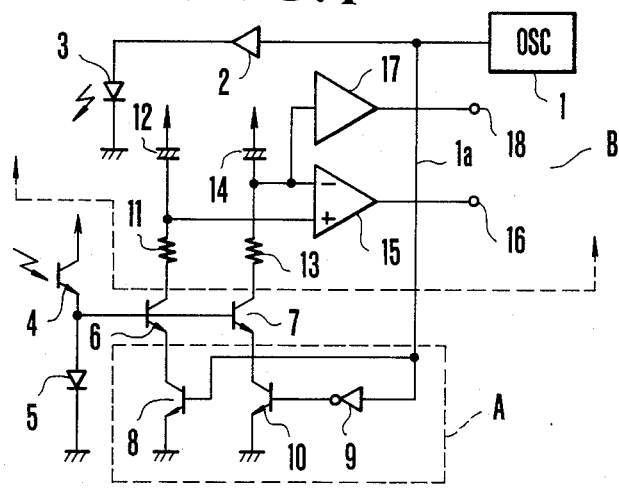
FIG. 1 is an electrical circuit diagram of an embodiment of a photoelectric transducer element according to the present invention.

FIG. 1 shows a first embodiment of the present invention. An oscillator OSC within a block 1 produces pulses of a predetermined frequency, which are supplied through an amplifier 2 to a light-emitting diode 3. Therefore, the light-emitting diode 3 is turned on and off repeatedly. The amplifier 2 and the light-emitting diode 3 constitute light emitting means.

A photoelectric transducing portion 4 is a light receiving portion receptive to the reflective light from an object illuminated with the projected light from the light emitting means 2, 3 and the ambient light. A diode 5 and two transistors 6 and 7, having a common base terminal, constitute a current mirror circuit. The collectors of the transistors 6 and 7 are connected respectively through resistors 11 and 13 to condensers 12 and 14 as storing means.

A block A has a switching circuit for controlling current transfer from the photoelectric transducing portion 4 to the aforesaid condensers or storing means 12 and 14, one at a time, in synchronization with the pulses from the oscillator OSC 1.

A difference amplifier 15 receives the outputs of the storing means 12 and 14 and computes only that signal component which is responsible for the projected light by the light emitting means 2, 3.

With the circuit of FIG. 1, during the time when the light emitting means 2, 3 is projecting light, the reflected light owing to projected light ambient light are converted to an electrical signal by the photoelectric transducing portion 4. Since an output signal line 1a of the oscillator OSC 1 is at the high level during the time when the light emitting means 2, 3 is supplied with the pulse, the switching circuit operates with a transistor 8 ON and therefore the transistor 6 of the current mirror circuit 5, 6, 7 is, ON. Hence the first storing means 12 stores the signal representing the sum of the reflected lights owing to the projected and ambient light.

When the oscillator OSC 1 produces a low level output signal; the transistor 8 is turned off, thereby the storing operation for the first storing means 12 is stopped. The low level signal from the oscillator OSC 1 is applied through an inverter 9 to turn on a transistor 10 and also to turn on the transistor 7 of the current mirror circuit 5, 6, 7, thereby the second storing means 14 stores the photoelectric transducing signal representing the reflected ambient light.

Applied to the difference amplifier 15 are the output signals of the first and second storing means 12, 14, and the difference between the signal of the first storing means 12 and the signal of the second storing means 14 is computed so that at an output terminal 16 there appears a signal representing the reflected light based only on the projected light by the light-emitting means 2, 3. It is at an output terminal 18 that another signal appears, representing only the reflected light of the ambient light stored on the second storing means 14 through an amplifier 17.

According to the feature of FIG. 1, a highly amplified photo transistor is operated at a lower current mode to obtain a highly sensitive output and a high S/N ratio, thereby it is possible to fabricate bipolar sensors as a unit with the light projection control circuit, reflected light detector circuit and proximity switches or range finders by using it.

Figure 2:
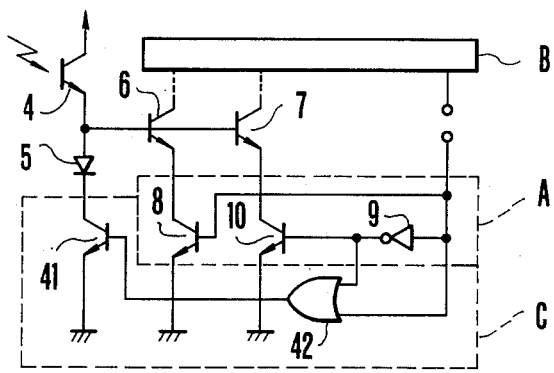
FIGS. 2–4 are electrical circuit diagrams illustrating examples of a modification of the circuit of FIG. 1.

FIG. 2 illustrates an example of a variation of the switching circuit A of the transistors 8 and 10 and the inverter 9 in FIG. 1.

In FIG. 2, a block B may be constructed by using elements similar to those shown in FIG. 1 which are the light emitting means 2, 3, the oscillator OSC 1, the first storing means 12 for storing the photoelectric transducing signal on the basis of projected and ambient light, the second storing means 14 for storing the photoelectric transducing signal on the basis of ambient light, computing means (the difference amplifier 15) for computing the projected light signal component, and the resistors 11 and 13. The circuit of FIG. 2 is different from that of FIG. 1 in that there is a synchronous circuit comprising a transistor 41 and an OR gate 42 shown within a block C.

In operating the circuit of FIG. 2, when the oscillator OSC 1 repeats the predetermined cycle of ON and OFF, the light emitting means 2, 3 projects light intermittently. A target object (not shown) reflects the projected and ambient light to the photoelectric transducing means 4. The emitter electrode of the photoelectric transducing means 4 produces a signal representing the received light.

When the oscillator OSC 1 is ON, or when the light is projected, the oscillator OSC 1 gives a high level signal to the signal line "a", thereby the transistors 6 and 8 are rendered conducting. Therefore, the photoelectric transducing signal representing the combined projected and ambient light passes through the resistor 11 to the first storing means or condenser 12. On the other hand, when the light emitting means 2, 3 is energized, the transistors 7 and 10, which are connected to the input terminal of the second storing means 14, are held non-conducting by the inverter 9. Then when the signal from the oscillator OSC 1 changes from ON to OFF, the inverter 9 renders the transistors 7 and 10 conducting, thereby the second storing means 14 is supplied with the photoelectric transducing signal for ambient light, excluding the projected light. The light receiving means or photo transistor 4 is actively operated during the time when the oscillator OSC 1 is ON and OFF by the inverter 9, OR gate 42 and transistor 41.

The above construction and arrangement of the elements of FIG. 2 is an example of cancelling the voltage which occurs when the transistor switch is ON, by using the same switch 41 in series to the diode 5 and an OR gate 42 which allows the switch 41 to open in both the first and second storing operations. Instead of using the OR gate 42, it is also possible to pull up the switch 41 so that its control signal is always high.

Figure 3:
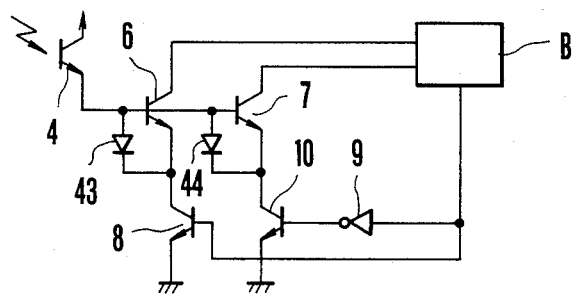

FIG. 3 illustrates still another modification in which, instead of using the common diode 5 for the current mirror, two diodes 43 and 44 are respectively in series to the selection switches 8 and 10, thereby the current converting difference due to the voltage at the time the switch is opened is cancelled.

In the circuit of FIG. 3, a block B may be formed similar to the block B of FIG. 1.

Figure 4:
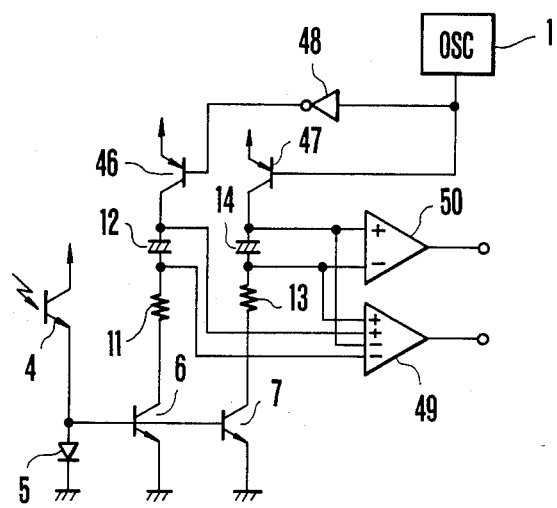

FIG. 4 illustrates a further modification in which there are provided two switches 46 and 47 on opposite sides of the storing portions 12, 14, and an inversion gate 48 for alternately storing the photo-currents on the storing portions 12 and 14. In this example, in order to make the output irrelevant to the switches 46 and 47, two difference amplifiers 50 and 49 are used to obtain the output, as it floats.

In FIG. 4, light emitting means (not shown) produces light in response to the oscillating operation of the oscillator OSC 1. It is noted that if the output is read out by turning off the photo transistor 4 with the switches 46 and 47 ON, the same difference amplifier 15 as in FIG. 1 suffices.

Figure 5:
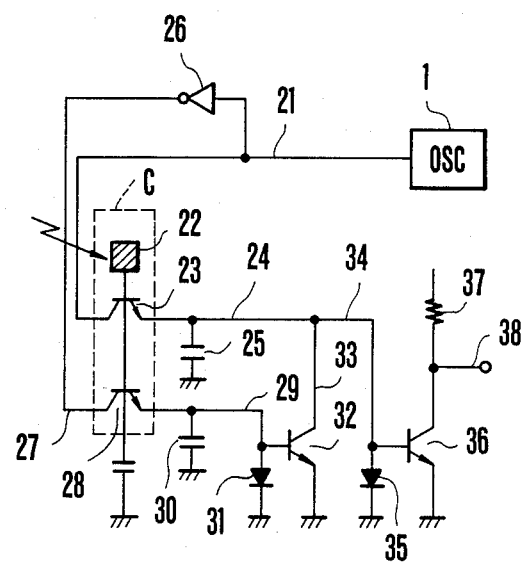
FIG. 5 is an electrical circuit diagram of another embodiment of the photoelectric transducer element according to the present invention.

FIG. 5 illustrates another embodiment of the invention applied to the circuit for detecting the projected light in synchronism with the projected light due to a line 21 similarly to FIG. 1.

The amount of light received by a photoelectric transducing portion 22, when in light projection, causes a photo transistor 23 of the common base to produce a photo current representing (ambient light)+(reflected projection light), which flows to a line 24 and an added capacitance 25. Also when no light is projected an inversion gate 26 produces a high level output, which is applied through a line 27, to the collector of a common based photo transistor 28. Therefore, a photo current representing (ambient light) of that period flows to a line 29 and another added capacitance 30. This photo current for ambient light is inverted by a current mirror circuit comprising a diode 31 and a transistor 32, so that the (ambient light) component is absorbed (exhausted) by a line 33 out of the (ambient light)+(reflected projection light) of the line 24. Therefore, a photo current for the (reflected projection light) flows to a line 34 and is then inverted by another current mirror circuit comprising a diode 35 and a transistor 36. Finally, it is produced in the form of a voltage proportional to the amount of reflected light at a line 38 by a resistor 37.

Because the added capacitances as described above, it is possible to obtain an efficient bipolar sensor capable of responding to sufficiently fast alternation of light projection and when synchronized thereto produces an output signal representing the averaged and smoothed highly accurate reflected light component alone and in a high S/N ratio, with the advantage that it can be easily fabricated as a unit with other parts.

Figure 6:
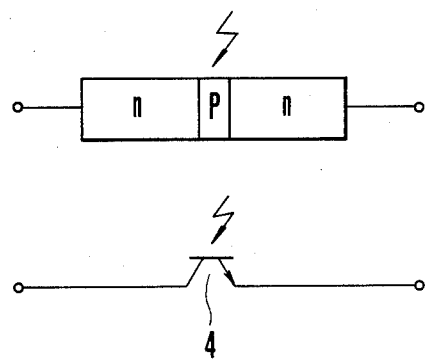
FIG. 6 is a structural view of the photo transistor of FIG. 1.

FIG. 6 illustrates a photo transistor of npn structure for realizing the features of FIGS. 1-4, which produces an output signal proportional to the light incident on a junction portion thereof.

Figure 7:
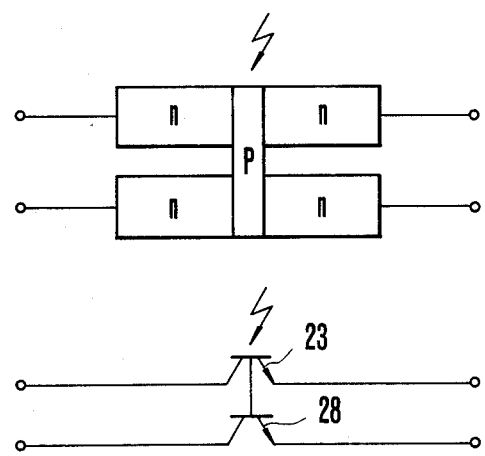
FIG. 7 is a structural view of the photo transistor of FIG. 5.

FIG. 7 illustrates photo transistors of npn structure with a common base, which produce output signals proportional to the light incident on the common base thereof, and which are adapted to attain the feature of FIG. 5.

Figure 8A:
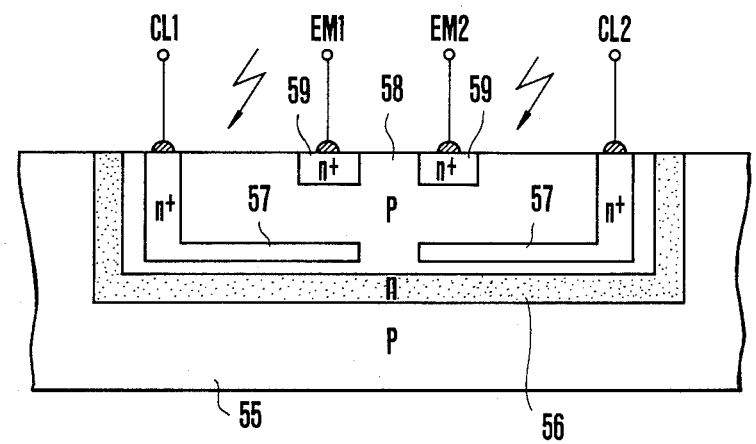
FIGS. 8(a)–8(c) illustrate a fabrication example of the photo transistor shown in FIG. 5.
Figure 8B:
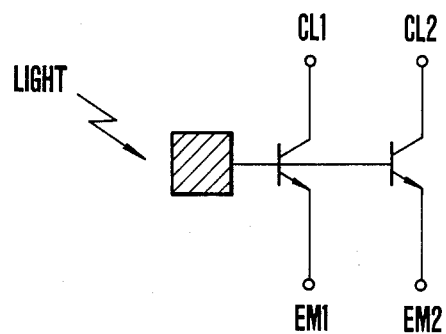
Figure 8C:
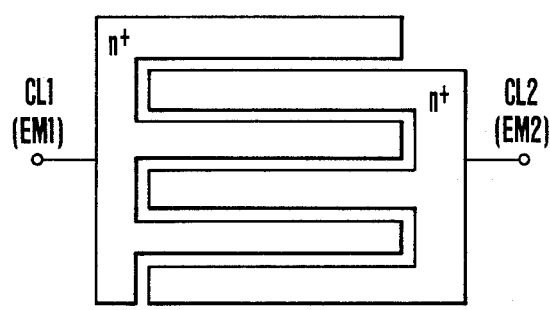

FIGS. 8(a), 8(b) and 8(c) illustrate an example of photo transistors having a common photosensitive base region in the block C of FIG. 5.

In FIG. 8(a), on a P-type substrate 55 is provided an n-type separation region 56, along with n+ layer regions 57, a P layer 58 and n+ layer regions 59 successively, constituting collectors CL1 and CL2, emitters EM1 and EM2 and the common base region.

FIG. 8(b) is a circuit equivalent to FIG. 8(a), and FIG. 8(c) amplifies an alternate comb-like arrangement of the collectors or emitters for the purpose of equalizing the characteristics of the two photo transistors.

FIG. 9 illustrates a further embodiment of the invention corresponding to FIGS. 1-4. In this embodiment, the photo signal is integrated and computed based on a reference voltage Vc (not shown). When in light projection, the photo signal for reflected light is applied through a current mirror circuit comprising transistors 105, $107_1$, $107_2$, $107_3$ and $107_4$ and a switching transistor 146 to be stored on a condenser 112 in the feedback path of an operational amplifier 153 of which the non-inversion input terminal is connected to the reference voltage Vc. On the other hand, when no light is projected, the photo signal for the ambient light (sun light) is applied through another current mirror circuit comprising transistors 105, $106_1$, $106_2$, $106_3$ and $106_4$ and another switching transistor 147 to be stored on a condenser 113 which is in the feedback path of an operational amplifier 152 of which the non-inversion input terminal is connected to the reference voltage Vc. Resistors 154–157 and an operational amplifier 158 constitute a difference amplifier circuit 149 for producing an output representing the difference between the two photo signals at the output terminal of the operational amplifier 158, as expressed by $$VAL-AD=VAL-VAD+Vc$$

That is, a signal responsive only to projected light with the exclusion of the ambient light signal is obtained.

Figure 10:
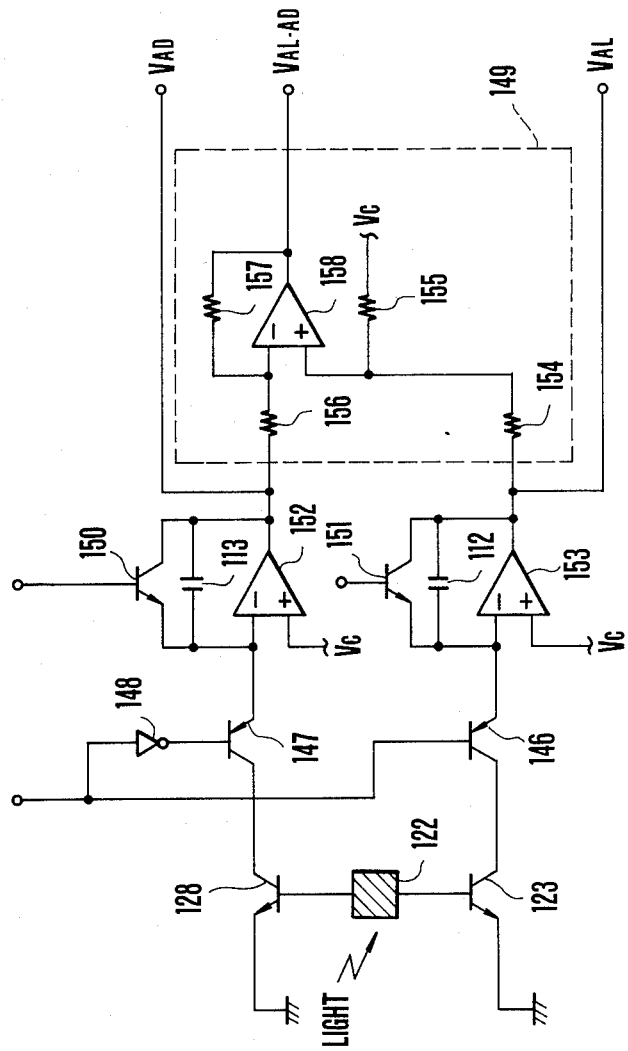
FIG. 10 is a circuitry diagram of another embodiment corresponding to the embodiment of FIG. 5.

FIG. 10 illustrates another embodiment corresponding to that of FIG. 5, as derived from the embodiment of FIG. 9 by replacing the photo transistor portions 104, 105, 106 and 107 by photo transistor portions 122, 123 and 128, having a common photo-sensitive area. The circuit of FIG. 10 operates in a manner similar to that of FIG. 9. Note that the transistors 150 and 151 are integration signal resetting transistors for the condensers 112 and 113.

What we claim:
1. A photoelectric transducer device comprising:
  (a) light sensitive means for receiving the reflected light from an object to produce an electrical signal corresponding to the reflected light from the object, said light sensitive means having an output to produce the electrical signal;
  (b) first memory means for memorizing an amplified electrical signal;
  (c) second memory means for memorizing an amplified electrical signal;
  (d) first amplifying transistor means for amplifying the electrical signal and transmitting the amplified electrical signal to the first memory means, the first amplifying transistor means having a control electrode;
  (e) second amplifying transistor means for amplifying the electrical signal and transmitting the amplified electrical signal therefrom to the second memory means, the second amplifying transistor means having a control electrode;
  (f) means for connecting both control electrodes of the first and second amplifying transistor means to the output of the light sensitive means;
  (g) first control means connected to the first amplifying transistor means for permitting the energization of the first amplifying transistor means in synchronism with energization of a light emitting means;
  (h) second control means connected to the second amplifying transistor means for permitting the energization of the second amplifying transistor means in synchronism with de-energization of the light emitting means; and
  (i) output means connected to the first and second memory means for producing an output signal corresponding to the difference between the electrical signal memorized in the first memory means and the electrical signal memorized in the second memory means.

2. A photoelectric transducer device according to claim 1, wherein the first and second amplifying transistor means form a current mirror.

3. A photoelectric transducer according to claim 1, wherein said first control means includes a transistor having a main electrode connected to a main electrode of said first amplifying transistor means.

4. A photoelectric transducer device according to claim 1, wherein said second control means includes a transistor having a main electrode connected to a main electrode of said second amplifying transistor means.

5. A photoelectric transducer device according to claim 1, wherein said output means includes a differential amplifier.

6. A photoelectric transducer device according to claim 1, wherein said first memory means includes a capacitor connected to a main electrode of said first amplifying transistor means.

7. A photoelectric transducer device comprising:
(a) light sensitive means for receiving the reflected light from an object to produce an electrical signal corresponding to the reflected light from the object;
(b) first memory means for memorizing an amplified electrical signal;
(c) second memory means for memorizing an amplified electrical signal;
(d) first amplifying transistor means for amplifying the electrical signal and transmitting the amplified electrical signal to the first memory means;
(e) second amplifying transistor means for amplifying the electrical signal and transmitting the amplified electrical signal therefrom to the second memory means;
(f) first control means connected to the first amplifying transistor means for permitting the energization of the first amplifying transistor means in synchronism with energization of a light emitting means;
(g) second control means connected to the second amplifying transistor means for permitting the energization of the second amplifying transistor means in synchronism with de-energization of the light emitting means; and
(h) output means connected to the first and second memory means for producing an output signal corresponding to the difference between the electrical signal memorized in the first memory means and the electrical signal memorized in the second memory means.

8. A photoelectric transducer device comprising:
(a) light emitting means for intermittently projecting light to an object;
(b) light sensitive means for receiving the reflected light from the object to produce an electrical signal corresponding to the reflected light from the object;
(c) first memory means for memorizing an amplified electrical signal;
(d) second memory means for memorizing an amplified electrical signal;
(e) first amplifying transistor means for amplifying the electrical signal and transmitting the amplified electrical signal to the first memory means;
(f) second amplifying transistor means for amplifying the electrical signal and transmitting the amplified electrical signal therefrom to the second memory means;
(g) first control means connected to the first amplifying transistor means for permitting the energization of the first amplifying transistor means in synchronism with energization of the light emitting means;
(h) second control means connected to the second amplifying transistor means for permitting the energization of the second amplifying transistor means in synchronism with de-energization of the light emitting means; and
(i) output means connected to the first and second memory means for producing an output signal corresponding to the difference between the electrical signal memorized in the first memory means and the electrical signal memorized in the second memory means.

* * * * *